April 12, 1927.
H. THOMAS
1,624,692
PROCESS OF MANUFACTURING GASOLINE
Filed Aug. 12, 1925
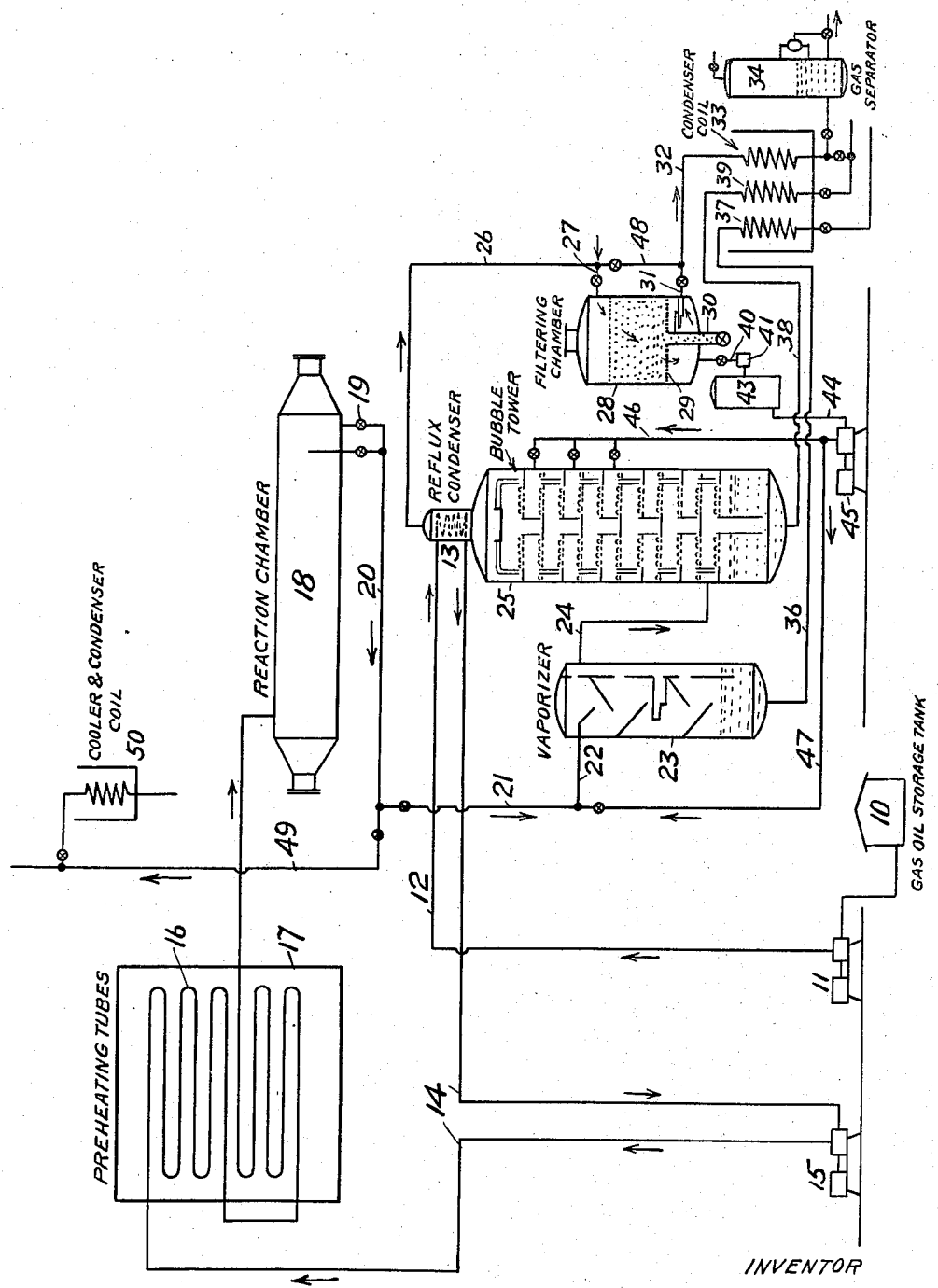
WITNESS:
INVENTOR
Henry Thomas
BY
ATTORNEYS Patented Apr. 12, 1927.

1,624,692

UNITED STATES PATENT OFFICE.

HENRY THOMAS, OF RIDLEY PARK, PENNSYLVANIA, ASSIGNOR TO SUN OIL COMPANY, OF PHILADELPHIA, PENNSYLVANIA, A CORPORATION OF NEW JERSEY.

PROCESS OF MANUFACTURING GASOLINE.

Application filed August 12, 1925. Serial No. 49,702.

The object of my invention is to provide a process whereby gasoline produced by any known distillation or cracking process may be freed of such of its impurities as produce a discoloration of the finished product. It is impossible, in any of the usual processes of distilling gasoline from higher boiling hydrocarbons, to avoid "cracking", which, as is well known, involves the breaking down of certain hydrocarbon compounds and the formation of new hydrocarbon compounds that comprise a large proportion of gasoline. In other words, the principal conditions incident to the distillation of petroleum oils, namely, temperature, pressure (including atmospheric pressure and indeed any absolute pressure above a vacuum) and time, are conditions that operate to "manufacture" lower boiling hydrocarbons from higher boiling hydrocarbons. By increasing any of the factors of pressure, temperature and time, the volume of the cracked product may be increased.

With some crude oils, careful distillation produces a distillate of good color. With other crudes, equally careful distillation produces a distillate of bad color, differing, apparently, only in degree from a distillate produced by cracking. With any crude, intentional cracking produces a distillate of bad color. It is known that any oil of bad color, including oil containing decomposition products, such as gasoline more or less of which has been produced by cracking, may be more or less decolorized by filtering it through a bed of finely divided solids, of which fuller's earth is perhaps the more commonly used, while the oil is in either a liquid phase or a vapor phase. Filtering the gasoline while it is in a vapor phase is perhaps more efficacious, but the gasoline vapors from a cracking still are so contaminated with undesirable constituents containing a large percentage of color bodies that, unless the clay bed be heated to a temperature above the condensing point of the entering vapors, the amount of condensate is very large, while if such high temperature conditions are maintained in the clay bed as to substantially prevent partial condensation, the percentage of color bodies that accumulate in the clay bed is so high that the filtering medium is rapidly clogged up with filtered out impurities and the process becomes economically inefficient.

The present process involves the partial purification of hydrocarbon vapors containing cracked gasoline by the initial removal therefrom of higher boiling constituents and the passage of the thus partially purified vapors through a clay bed or other decolorizing agent under such conditions of temperature as to allow the condensation in the clay bed of a part of the vapors. Preferably, this involves avoidance of the application of heat to the clay bed, whose temperature is not above that to which it is brought by the heat of the vapors. Preferably, also, the product is cracked while being largely maintained, by the pressure of its own vapors, in a liquid state, and this product is then subjected to three operations: namely, vaporization, which occurs under release or substantial reduction of pressure with the throwing down, in a liquid condition, of heavier constituents; refluxing, or partial condensation, of the vapors, with the passage of the vapors through and in intimate contact with the condensate, the operation being most conveniently carried on in the known "bubble tower"; and final purification and decolorization, which occurs in the filtering medium, and under conditions that permit the formation of more or less condensate. The process involves, also, in its preferred embodiment, the transfer of the condensate to the vaporizer or to the bubble tower.

The process is not dependent for its execution on any particular apparatus. An apparatus, however, in which the entire process of cracking, as well as purification and decolorization, may be efficiently carried out is shown in the accompanying drawings, in which the figure is a diagrammatic view of the entire plant.

The gas oil or other hydrocarbon oil to be cracked to gasoline is taken, by a pump 11, from a tank 10, through a line 12, reflux condenser 13 and line 14, through which, by means of a pump 15, it is conveyed through coils 16 in a furnace 17. In this furnace the oil is heated, preferably to a cracking temperature. Thence the oil flows to a reaction chamber 18, in which the oil is cracked under a high pressure. Preferably the oil in chamber 18, and also in the heater, is maintained under pressure of evolved gases of the oil, the pressure being sufficient to prevent vaporization of any substantial proportion of the oil. The cracking process may be carried out in accordance with the Cross Patent No. 1,423,500, although other processes of cracking under pressure may be substituted. The oil, released by a valve 19, is continuously removed from the reaction chamber, and is conveyed, through lines 20, 21 and 22, to a vaporizer 23. Owing to the release of pressure on the oil, the larger part of the oil vaporizes (most of it indeed vaporizing immediately on escaping through valve 19), the remaining oil (about five to ten per cent of the total) being thrown down in the vaporizer.

The vapors leave the vaporizer through a line 24 and pass into a bubble tower 25. The bubble tower may be of any known construction that forces the vapors to bubble up through descending condensed oil, as, for example, that disclosed in the patent application of Pew and Thomas, Serial No. 694,470, filed February 23, 1924.

The uncondensed vapors leave the bubble tower at the top and, through lines 26 and 27, pass into and through a bed of decolorizing material, such as fuller's earth, charcoal, Death Valley earth, bauxite, the product resulting from the reaction of a soluble silicate with ammonium aluminum sulfate, or other suitable material.

The chamber containing this decolorizing agent may comprise a cylindrical tank 28 containing a perforated screen 29 which prevents the overlying decolorizing material from passing through it, but which permits the passage of vapor and condensate, a valved pipe 30 through which said material may be discharged by gravity, a vapor outlet pipe 31 and an outlet pipe 40 for condensate.

The treated vapors leaving through pipe 31 flow through pipe 32 into a condenser coil 33 and thence into a separator 34, where the permanent gas is taken off and is removed at the top. The gasoline leaves from a lower connection 35 to a storage tank (not shown).

The oil which is condensed, or not vaporized, in vaporizer 23 is drawn off at the bottom and, through line 36, flows to a cooler coil 37 and thence to storage.

The oil which is thrown down in the bubble tower 25 is drawn off at the bottom and, through line 38, flows to a cooler coil 39 and thence to storage.

The condensate that leaves the decolorizer 28 through outlet pipe 40 flows through a trap 41 into a receiving tank 43, and through line 44 and pump 45, either through line 46 to bubble tower 25 or through line 47 to vaporizer 23.

A valved by-pass pipe 48 connects lines 26 and 32.

The oil and vapor escaping from the reaction chamber 18 through line 20 may be diverted, through line 49, to a cooler and condenser coil 50 and thence to storage. This arrangement permits the establishment of a temporary circulation of oil in starting up the plant in order to establish the temperature and other fixed conditions which are necessary for the efficient operation of the plant in a continuous manner. This circulation may also be established preparatory to shutting down the plant. Thereby it is insured that no gas oil shall pass to the regular condenser and contaminate the gasoline. The condenser and cooling coil 50 may be used for one or for several units.

Having now fully described my invention, what I claim and desire to protect by Letters Patent is:

1. The process of producing decolorized gasoline which comprises subjecting a flowing stream of a hydrocarbon containing a large proportion of gasoline and while in a vapor state to partial condensation and intimately mixing vapors of the flowing stream with the condensate of the same stream, thereby effecting separation from the hydrocarbon of higher boiling constituents with resultant partial purification of the gasoline vapors, filtering the uncondensed vapors of the flowing stream of hydrocarbon through a body of a decolorizing material, maintaining such temperature of filtration as will permit a portion of the vapors to condense, condensing the decolorized vapors that are uncondensed in the body of decolorizing material, and conveying the condensate from said body of decolorizing material to the hydrocarbon vapors flowing toward the locus of decolorization.

2. The process of producing decolorized gasoline which comprises releasing the pressure on cracked hydrocarbon that is largely in a liquid phase and under high pressure and contains a substantial proportion of gasoline and allowing a predominating proportion of the liquid hydrocarbons to vaporize within an expanded space, the vapor within said space containing said gasoline and heavier hydrocarbons, separating out the minor portion of the hydrocarbons in a liquid condition, subjecting a flowing stream of such vapor to partial condensation and intimately mixing vapors of the flowing stream with the condensate of the same stream, thereby effecting separation from the hydrocarbon of higher boiling constituents with resultant partial purification of the gasoline vapors, filtering the uncondensed vapors of the flowing stream of hydrocarbon through a body of a decolorizing material, maintaining such temperature of filtration as will permit a portion of the vapors to condense, and condensing the decolorized vapors that are uncondensed in the body of decolorizing material.

3. The process of producing decolorized gasoline which comprises subjecting a flowing stream of a hydrocarbon containing a large proportion of gasoline and while in a vapor state to partial condensation and intimately mixing vapors of the flowing stream with the condensate of the same stream, thereby effecting separation from the hydrocarbon of higher boiling constituents with resultant partial purification of the gasoline vapors, passing the uncondensed vapors of the flowing stream downwardly through a body of decolorizing material, maintaining such temperature of filtration as will permit a portion of the vapors to condense, the vapors being constrained to flow downwardly through the body of decolorizing material and the vapors as well as the condensate emerging from the bottom of said body, and condensing the decolorized vapors that are uncondensed in the body of decolorizing material.

In testimony of which invention, I have hereunto set my hand, at Marcus Hook, Pennsylvania, on this 6th day of August, 1925.

HENRY THOMAS.